United States Patent
Park et al.

(10) Patent No.: US 7,876,396 B2
(45) Date of Patent: Jan. 25, 2011

(54) BACKLIGHT ASSEMBLY, DISPLAY APPARATUS HAVING THE SAME AND METHOD FOR ASSEMBLING THE SAME

(75) Inventors: Jin-Ho Park, Suwon-si (KR); Won-Seok Kim, Seoul (KR); Sang-Soo Kim, Seoul (KR); Doo-Won Lee, Seoul (KR); Hea-Chun Lee, Suwon-si (KR); Young-Jae Lee, Yongin-si (KR); Nam-Heon Kim, Yongin-si (KR); Chae-Woo Chung, Cheonan-si (KR); Sang-Wook Lee, Seoul (KR); Kwang-Soo Lee, Yonngin-si (KR); Jin-Ho Cho, Cheonan-si (KR); Jae-Hyun Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 128 days.

(21) Appl. No.: 12/269,819

(22) Filed: Nov. 12, 2008

(65) Prior Publication Data

US 2009/0147181 A1    Jun. 11, 2009

(30) Foreign Application Priority Data

Dec. 10, 2007   (KR)   .................. 10-2007-0127558

(51) Int. Cl.
*G02F 1/1335*   (2006.01)
*H01L 21/00*   (2006.01)
*G09F 13/04*   (2006.01)

(52) U.S. Cl. .................. 349/64; 349/56; 349/187; 362/97.2; 438/30

(58) Field of Classification Search ............. 349/64, 349/61, 58, 56, 112, 113, 161, 156, 187; 362/97.2; 438/30

See application file for complete search history.

(56) References Cited

U.S. PATENT DOCUMENTS

| | | | |
|---|---|---|---|
| 6,880,947 B2 * | 4/2005 | Hsieh et al. | 362/614 |
| 7,663,730 B2 * | 2/2010 | Shibata | 349/161 |
| 2006/0104087 A1 * | 5/2006 | Leu | 362/600 |
| 2008/0019145 A1 * | 1/2008 | Cho et al. | 362/601 |
| 2008/0030653 A1 * | 2/2008 | Lee et al. | 349/67 |
| 2008/0111949 A1 * | 5/2008 | Shibata et al. | 349/64 |
| 2009/0147181 A1 * | 6/2009 | Park et al. | 349/64 |

FOREIGN PATENT DOCUMENTS

| | | | | |
|---|---|---|---|---|
| JP | 2004-22246 | 1/2004 | ............... | 349/64 X |
| JP | 2004-53749 | 2/2004 | ............... | 349/64 X |
| JP | 2004-0046792 | 6/2004 | ............... | 349/64 X |

* cited by examiner

*Primary Examiner*—Brian M Healy
(74) *Attorney, Agent, or Firm*—Innovation Counsel LLP

(57) ABSTRACT

A backlight assembly comprises a light source unit emitting light, a heat-blocking plate disposed over the light source unit to prevent heat generated from the light source unit from being upwardly transmitted, and a receiving container receiving the light source unit and the heat-blocking plate. The receiving container includes a bottom plate and a plurality of sidewalls. Each of the sidewalls extends from a side of the bottom plate and has openings formed through each of the sidewalls. The openings are formed over the heat-blocking plate.

23 Claims, 6 Drawing Sheets

BACKLIGHT ASSEMBLY, DISPLAY APPARATUS HAVING THE SAME AND METHOD FOR ASSEMBLING THE SAME

CROSS-REFERENCE TO RELATED APPLICATIONS

This application claims priority under 35 U.S.C. §119 to Korean Patent Application No. 2007-127558, filed on Dec. 10, 2007 in the Korean Intellectual Property Office (KIPO), the contents of which are herein incorporated by reference in their entirety.

BACKGROUND OF THE INVENTION

1. Field of the Invention

The present invention relates to a backlight assembly, a display apparatus having the backlight assembly and a method for assembling the backlight assembly. More particularly, the present invention relates to a backlight assembly having enhanced heat dissipation, a display apparatus having the backlight assembly and a method for assembling the backlight assembly.

2. Description of the Related Art

Generally, liquid crystal display (LCD) apparatuses which display images using liquid crystal are used for digital information displays (DIDs) including, for example, DIDs used for advertising among other uses. However, an LCD apparatus includes an LCD panel that does not emit light by itself and receives the light externally provided to the LCD panel. Thus, the LCD apparatus requires a backlight assembly providing the light to the LCD panel. Further, the backlight assembly includes a light source emitting the light, optical members enhancing light efficiency and a bottom chassis receiving the light source and the optical members.

A DID generally requires a luminance greater than 700 nits, so that the light sources in the DID generate a relatively large amount of heat. Thus, the temperature inside of the backlight assembly is also increased.

The heat generated from the backlight assembly is dissipated into the bottom chassis or the LCD panel. In this case, as the difference of the temperature between the inside and outside of the backlight assembly is increased, the heat is dissipated at a higher rate. However, when the DID is used outdoors, sunlight may be incident on the LCD panel, so that the difference of the temperature between the inside and outside of the backlight assembly may be decreased. In this case, the heat is dissipated at a lower rate and the temperature inside of the backlight assembly is increased, possibly damaging the LCD panel.

SUMMARY OF THE INVENTION

The present invention provides a backlight assembly having enhanced heat dissipation.

The present invention also provides a display apparatus having the backlight assembly.

The present invention also provides a method for assembling the backlight assembly.

In an example embodiment, a backlight assembly may include a light source unit, a heat-blocking plate and a receiving container. The light source unit emits light. The heat-blocking plate is disposed over the light source unit, to prevent heat generated from the light source unit from being upwardly transmitted. The receiving container sequentially receives the light source unit and the heat-blocking plate, and includes a bottom plate and a plurality of sidewalls. Each of the sidewalls extends from each side of the bottom plate and has openings formed through each of the sidewalls. The openings are formed over the heat-blocking plate.

The backlight assembly may further include a diffusion plate disposed over the sidewalls to diffuse the light incident from the light source unit, and optical sheets disposed over the diffusion plate to enhance the efficiency of the light incident from the light diffusion plate.

In addition, the backlight assembly may further include a reflective plate disposed under the light source unit and received by the receiving container to reflect the light from the light source unit to the diffusion plate, and a heat-dissipation plate disposed under the reflective plate and received by the receiving container to diffuse the heat generated from the light source unit to the bottom plate of the receiving container.

In an example embodiment, a backlight assembly may include a light source unit, a heat-blocking plate, a first receiving container and a second receiving container. The light source unit emits light. The heat-blocking plate is disposed over the light source unit, to prevent heat generated from the light source unit from being upwardly transmitted. The first receiving container includes a bottom plate and a plurality of first sidewalls extending from sides of the bottom plate to form a receiving space, in order to sequentially receive the light source unit and the heat-blocking plate. The second receiving container is disposed over the heat-blocking plate, is combined with the first sidewalls of the first receiving container, and includes a plurality of second sidewalls having openings formed through the second sidewalls.

In an example embodiment, a display apparatus may include a backlight assembly, a display panel and upper and lower mold frames. The backlight assembly includes a light source unit, a heat-blocking plate, a receiving container and a diffusion plate. The light source unit emits light. The heat-blocking plate is disposed over the light source unit, to prevent heat generated from the light source unit from being upwardly transmitted. The receiving container receives the light source unit and the heat-blocking plate, and includes a bottom plate and a plurality of sidewalls. Each of the sidewalls extends from a side of the bottom plate and has openings formed through each of the sidewalls. The openings are formed over the heat-blocking plate. The diffusion plate is disposed over the sidewalls of the receiving container, to diffuse the light incident from the light source unit. The display panel is disposed over the backlight assembly to display an image. The upper and lower mold frames fix the display panel.

The display apparatus may further include a covering part covering the outside of the backlight assembly, a display panel and the upper and lower mold frames, to prevent foreign matter from flowing into the backlight assembly, a display panel and the upper and lower mold frames.

In an example embodiment, the display apparatus may further include a cooling part disposed around the covering part, to circulate air inside of the covering part.

In another example embodiment, a display apparatus may include a backlight assembly, a display panel and upper and lower mold frames. The backlight assembly includes a light source unit, a first receiving container, a second receiving container and a diffusion plate. The light source unit emits light. The first receiving container includes a bottom plate and a plurality of first sidewalls extending from sides of the bottom plate respectively to form a receiving space, in order to sequentially receive the light source unit. The second receiving container is combined with the first sidewalls of the first receiving container, and includes a plurality of second sidewalls having openings formed through the second sidewalls.

The diffusion plate is disposed over the second sidewalls of the second receiving container, to diffuse the light incident from the light source unit. The display panel is disposed over the backlight assembly to display an image. The upper and lower mold frames fix the display panel.

The display apparatus may further include a covering part covering the outside of the backlight assembly, a display panel and the upper and lower mold frames, to prevent foreign matter from flowing into the backlight assembly, a display panel and the upper and lower mold frames.

The display apparatus may further include a cooling part disposed around the covering part, to circulate air inside of the covering part.

In an example embodiment, a method for assembling a backlight assembly may include disposing a heat-blocking plate over a light source unit and receiving a light source unit and a heat-blocking plate under openings of sidewalls in a receiving space. The receiving space may be formed by a receiving container including a bottom plate and a plurality of sidewalls extending from sides of the bottom plate respectively. The sidewalls may include the openings formed through the sidewalls.

In an example embodiment, a heat-blocking plate may be disposed over a light source unit to prevent heat generated from the light source unit from being transmitted to a display panel. Thus, the display panel may be prevented from being deformed due to the heat.

In an example embodiment, openings may be formed through sidewalls of a receiving container and may be formed over the heat-blocking plate, so that the heat generated from the light source unit may be externally dissipated before the heat reaches the display panel. Thus, the temperature inside of a backlight assembly may be decreased and the display panel may be prevented from being deformed due to the heat.

In an example embodiment, the outside of the backlight assembly and the display panel may be covered, so that foreign matter may be prevented from flowing into the inside of the display panel. Thus, the display quality of the display panel may be maintained.

In an example embodiment, a display apparatus may include a cooling part, so that air inside of the backlight assembly and the display panel may be circulated through the openings. Thus, the temperature inside of the backlight assembly may be decreased, to prevent deformation of the display panel due to the heat.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

Figure 1:
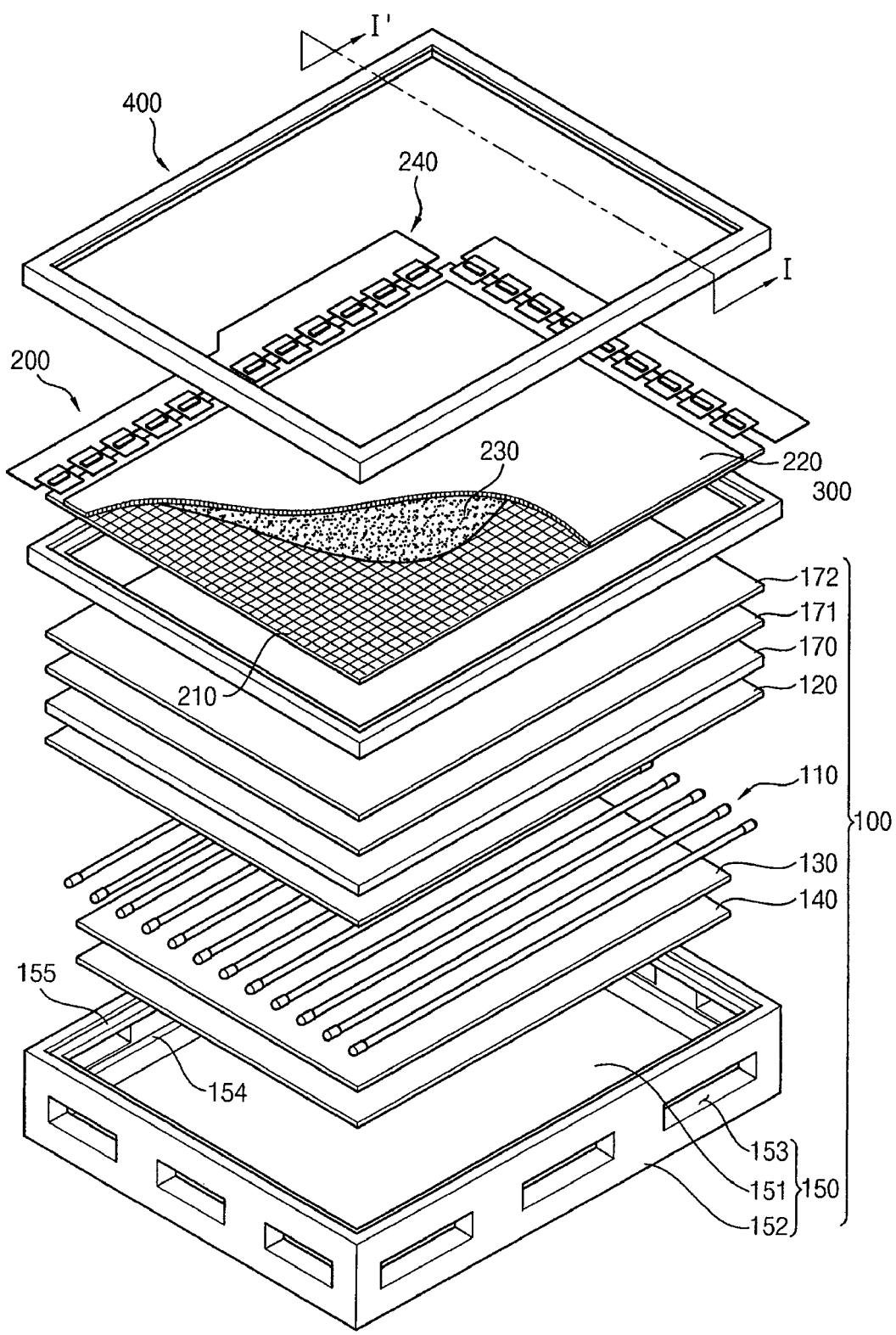
FIG. 1 is an exploded perspective view illustrating an example embodiment of a backlight-display panel assembly.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
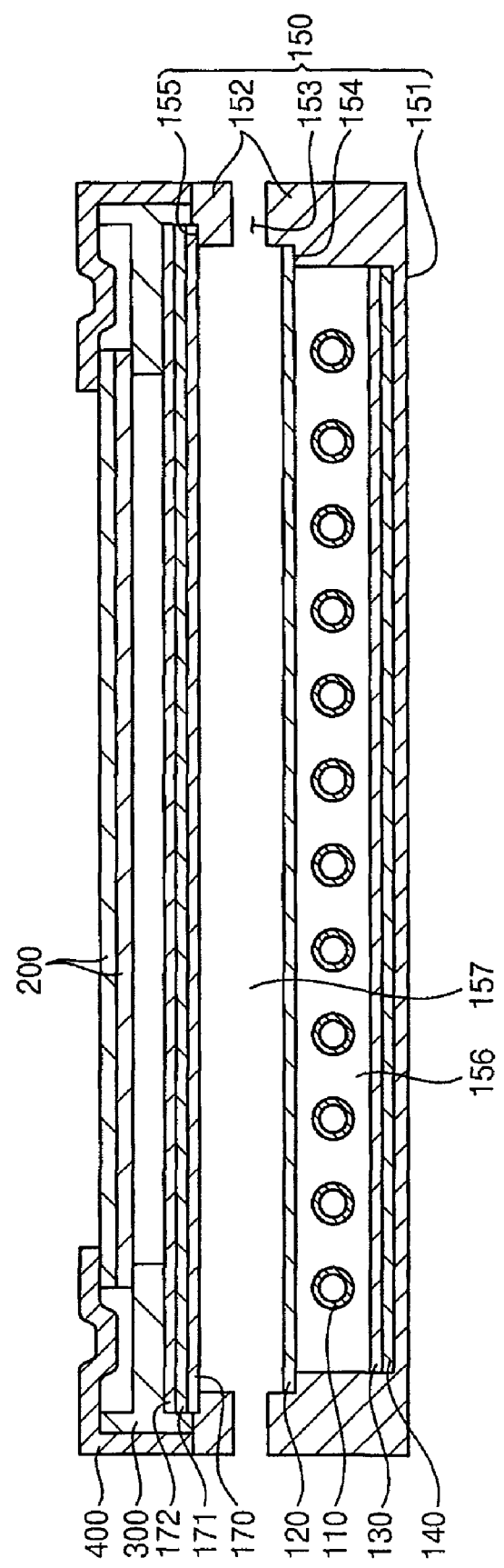
FIG. 2 is a cross-sectional view taken along a line I-I' in FIG. 1.

FIG. 1 is an exploded perspective view illustrating a backlight-display panel assembly according to an example embodiment of the present invention. FIG. 2 is a cross-sectional view taken along a line I-I' in FIG. 1.

Referring to FIGS. 1 and 2, in an exemplary embodiment, a backlight-display panel assembly 500 may include a backlight assembly 100, a display panel 200, a lower mold frame 300 and an upper mold frame 400.

The backlight assembly 100 may include a light source unit 110, a heat-blocking plate 120 and a receiving container 150. The backlight assembly 100 may further include a reflective plate 130, a heat-dissipation plate 140, a diffusion plate 170 and optical sheets 171 and 172.

The light source unit 100 emits light and provides the light to the display panel 200. For example, the light source unit 110 may include a lamp as illustrated in FIG. 1. The light source unit 110 may include a plurality of lamps parallel with each other, and the number of the lamps depends on a brightness level required to be provided to the display panel 200. The lamps may be entirely arranged over a bottom plate of the receiving container 150, and may be received by the receiving container 150. Alternatively, a lamp-fixing member may be combined with the receiving container 150 to fix and support the lamps. In addition, various light sources other than the lamps may be used as the light source unit 110.

The heat-blocking plate 120 may be disposed over the light source unit 110, to prevent heat generated from the light source unit 110 from being transmitted over the heat-blocking plate 120. For example, the heat-blocking plate 120 may be mounted on a first stepped portion 154 formed at the receiving container 150, to be fixed and supported by the first stepped portion 154. The heat-blocking plate 120 may be fixed by the first stepped portion 154, so that a receiving space formed by the receiving container 150 is divided into a first receiving space 156 and a second receiving space 157 by the heat-blocking plate 120. For example, the light source unit 110 may be received by the first receiving space 156.

Accordingly, the light source unit 110 may be received by the first receiving space 156, so that the heat generated from the light source unit 110 may not be directly transmitted to the display panel 200. Thus, the temperature in the second receiving space 157 may be lower than the temperature in the first receiving space 156. The heat-blocking plate 120 may include a transparent plastic material, so that the light emitted from the light source unit 110 passes through the heat-blocking plate 120. For example, the heat-blocking plate 120 may include an acrylic resin. Alternatively, the heat-blocking plate 120 may include a hazed surface. Surface roughness of the hazed surface is increased so that the direction of the light may be changed when the light passes through the heat-blocking plate 120. Thus, the light is diffused. In addition, the heat-blocking plate 120 may include a material substantially the same as the diffusion plate 170.

In an example embodiment, the receiving container 150 includes a bottom plate 151 and a plurality of sidewalls 152. The bottom plate 151 may include a rectangular shape. The sidewalls 152 are respectively extended from four sides of the bottom plate 151, and the sidewalls 152 are substantially perpendicular to the bottom plate 151. The receiving space 156 and 157 is formed by the bottom plate 151 and the sidewalls 152. The bottom plate 151 and the sidewalls 152 may be integrally formed, and alternatively, the bottom plate 151 and the sidewalls 152 may be combined by an element. The first stepped portion 154 may be formed at the sidewalls 152 and may protrude inside of the receiving space 156 and 157. A second stepped portion 155 that is disposed over the first stepped portion 154 may be formed at the sidewalls 152 and may protrude inside of the receiving space 156 and 157.

The heat-dissipation plate 140, the reflective plate 130 and the light source unit 110 may be sequentially received in the receiving space 156 and 157 that is formed by the bottom plate 151 and the sidewalls 152. The heat-blocking plate 120 may be fixed and supported by the first stepped portion 154 formed at the sidewalls 152. The diffusion plate 170 and the optical members 171 and 172 may be mounted on the second stepped portion 155 of the sidewalls 152 of the receiving container 150. The receiving container 150 may be combined with the upper and lower mold frames 300 and 400, to fix and support the diffusion plate 170 and the optical members 171 and 172.

In an example embodiment, openings 153 are formed through the sidewalls 152. For example, the openings 153 may be disposed over the first stepped portion 154 on which the heat-blocking plate 120 is fixed. As illustrated in FIG. 1, the openings 153 are formed, for example, through all of the sidewalls 152. Alternatively, the openings 153 may be formed through some of the sidewalls 152. In addition, the openings 153 may have a rectangular shape as illustrated in FIG. 1, and alternatively, the openings 153 may have various shapes such as a circular shape and so on. Further, the number of the openings 153 may be not limited to what is illustrated in FIG. 1. For example, a net, a filter or other appropriate element or device may be formed around the openings 153 to minimize influx of foreign matter. In addition, a fan may be attached around the opening 153 to circulate the air inside of the receiving container 150 with the air outside of the receiving container 150.

In an example embodiment, the openings 153 are formed through the sidewalls to face each other, to enhance heat dissipation. For example, when a first side of the bottom plate 151 faces a second side of the bottom plate, the openings 153 formed through the sidewall extending from the first side of the bottom plate 151 respectively face the openings 153 formed through the sidewall extending from the second side of the bottom plate 151. Thus, the air inside of the second receiving space 157 may easily flow outside of the second receiving space 157.

Accordingly, the openings 153 may be formed over the heat-blocking plate 120, so that the first receiving space 156 is enclosed but the second receiving space 157 is open. Thus, the air having a high temperature inside of the second receiving space 157 may be externally circulated, so that the temperature inside of the second receiving space 157 may be decreased. Because the first receiving space 156 is enclosed, the temperature inside of the first receiving space 156 may decrease less. However, the light source unit 110 is sensitive to variations of the temperature, so that the brightness may be partially decreased or the durability of the light source unit 110 may be decreased when the air is circulated in the first receiving space 156. Thus, the first receiving space 156 is ideally an enclosed space.

The receiving container 150 may include a metal having better heat conductivity to easily dissipate the heat generated from the light source unit 110. For example, the receiving container 150 may include an aluminum material.

The reflective plate 130 is disposed under the light source unit 110, and is received by the first receiving space 156 formed by the receiving container 150. The reflective plate 130 reflects the light leaked from the diffusion plate 170 into the diffusion plate 170. Thus, the light efficiency of the backlight assembly 100 may be enhanced.

In an example embodiment, the heat-dissipation plate 140 is disposed under the reflective plate 130, and is received by the first receiving space 156 formed by the receiving container 150. The heat-dissipation plate 140 may dissipate the heat to the bottom plate 151. The heat may be generated from the light source unit 110 and may be transmitted to the bottom plate 151 of the receiving container 150. For example, the heat-dissipation plate 140 may include a material having good heat conductivity. For example, the heat-dissipation plate 140 may be attached to the bottom plate 151 to increase heat dissipation.

Alternatively, the heat-dissipation plate 140 may be attached to an outer surface of the bottom plate 151 of the receiving container 150. For example, the bottom plate 151 may be disposed between the reflective plate 130 and the heat-dissipation plate 140. In this case, the heat-dissipation plate 140 may dissipate the heat transmitted from the bottom plate 151 to the outside.

In an example embodiment, the diffusion plate 170 is disposed over the sidewalls 152 of the receiving container 150. For example, the diffusion plate 170 may be mounted on the second stepped portion 155 which is formed at the sidewalls 152 of the receiving container 150, so that the diffusion plate 170 is fixed and supported by the sidewalls 152, and the upper and lower mold frames 300 and 400. Thus, the diffusion plate 170 encloses an upper portion of the second receiving space 157.

The optical sheets 171 and 172 may be disposed over the diffusion plate 170, so that the optical sheets 171 and 172 are fixed and supported by the sidewalls 152 of the receiving container 150 and the upper and lower mold frames 300 and 400. For example, the optical sheets 171 and 172 may include a diffusion sheet 171 and a prism sheet 172, to enhance the efficiency of the light passing through the diffusion plate 170. The diffusion sheet 171 diffuses the light emitting from the light source unit 110 and passing through the diffusion plate 170. The prism sheet 172 may be disposed over the diffusion sheet 171. The prism sheet 172 condenses the light diffused by the diffusion sheet 171 and provides the light to the display panel 200.

The display panel 200 may include an upper substrate, a lower substrate and a liquid crystal disposed between the upper and the lower substrates. Electrical and optical characteristics of the liquid crystals are changed, so that the display panel 200 displays an image based on the light provided from the backlight assembly 100. An edge portion of the display panel 200 may be fixed and may be supported by the upper and lower mold frames 300 and 400.

The lower mold frame 300 may include a frame shape which may be substantially the same as a rectangular parallelepiped having openings of upper and lower surface corresponding to each other. The lower mold frame 300 may be disposed under the display panel 200 and over the optical sheets 171 and 172. The lower mold frame 300 may be combined with the upper mold frame 400 and the receiving container 100 to support and receive the display panel 200.

The upper mold frame 400 may include a box shape which is substantially the same as the rectangular parallelepiped having an opening of a bottom surface. The upper mold frame 400 may be disposed over the display panel 200 and cover the edge portion of the display panel 200 to open an effective display area of the display panel 200. The upper mold frame 400 may be combined with the lower mold frame 300 and the receiving container 100 to fix and support the display panel 200.

Figure 3:
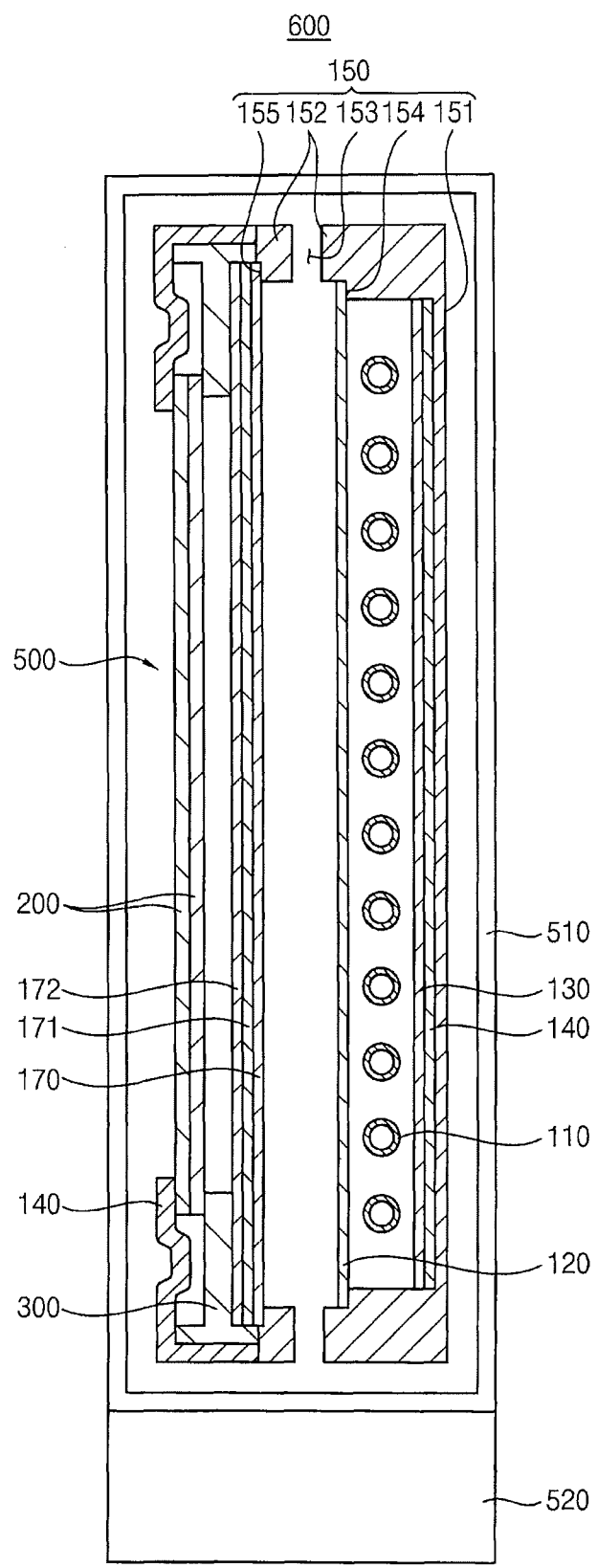
FIG. 3 is a side view illustrating an example embodiment of a display apparatus including the backlight-display panel assembly in FIG. 1.

FIG. 3 is a side view illustrating an exemplary embodiment of a display apparatus including the backlight-display panel assembly in FIG. 1.

Referring to FIG. 3, in an exemplary embodiment, the display panel 600 may include a backlight-display panel assembly 500, a covering part 510 and a cooling part 520. The backlight-display panel assembly 500 according to the present example embodiment may be substantially the same as the backlight-display panel assembly in the previous example embodiment of FIGS. 1 and 2. Thus, the same reference numerals will be used to refer to the same or like parts as those described in the previous example embodiment and any further repetitive explanation concerning the above elements will be omitted.

The covering part 510 may be spaced apart from the backlight assembly 100, the display panel 200 and the upper and lower mold frames 300 and 400 by a predetermined distance. Thus, a space in which air is circulated may be formed between the covering part 510, and the backlight assembly 100, the display panel 200 and the upper and lower mold frames 300 and 400. The covering part 510 encloses the backlight assembly 100, the display panel 200 and the upper and lower mold frames 300 and 400 from the outside. Thus, foreign matter may be prevented from flowing into the inside of the backlight assembly 100 and the display panel 200 through the openings 153 formed through the receiving container 100.

Accordingly, the air may be circulated inside the covering part 510 by the covering part 510. For example, the air may be circulated inside the covering part 510 due to natural convection, and the circulated air may pass through the openings 153, so that the heat inside of the second receiving container 157 may be dissipated and the temperature inside of the second receiving container 157 may be decreased.

Alternatively, the cooling part 520 may be disposed around the covering part 510, so that the air inside of the covering part 510 may be forcefully circulated. For example, the cooling part 520 may cool the air inside of the covering part 510 and forcefully generate convection at the same time, so that the air inside of the covering part 510 may be circulated. Thus, the air cooled by the cooling part 520 passes through the openings 153, the heat inside of the second receiving container 157 may be dissipated and the temperature inside of the second receiving container 157 may be decreased. In the exemplary embodiment illustrated in FIG. 3, the cooling part 520 is combined with a lower surface of the covering part 510. Alternatively, the cooling part 520 may be combined with a side surface or an upper surface of the covering part 510.

Figure 4:
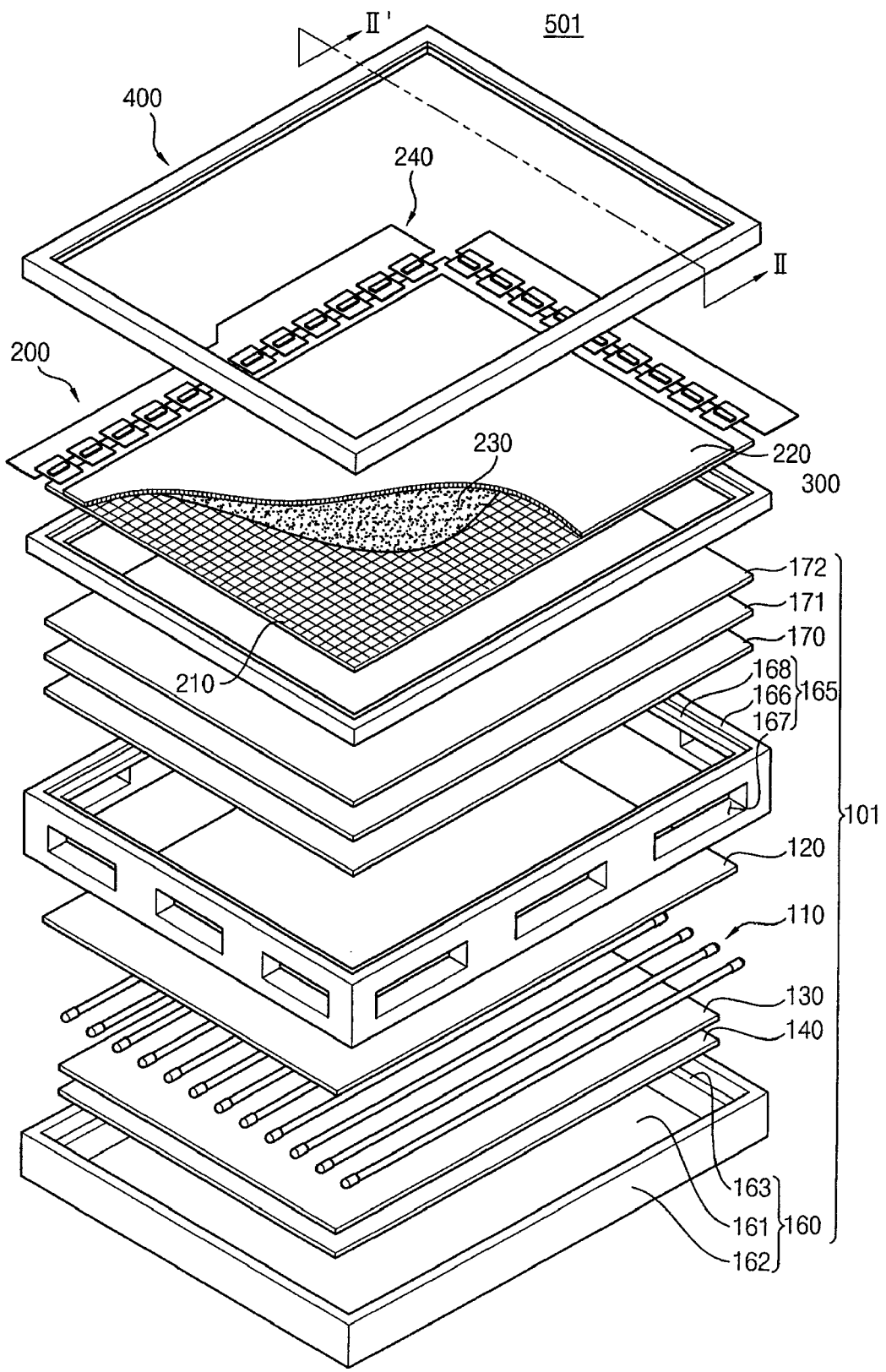
FIG. 4 is an exploded perspective view illustrating an example embodiment of a backlight-display panel assembly.
Figure 5:
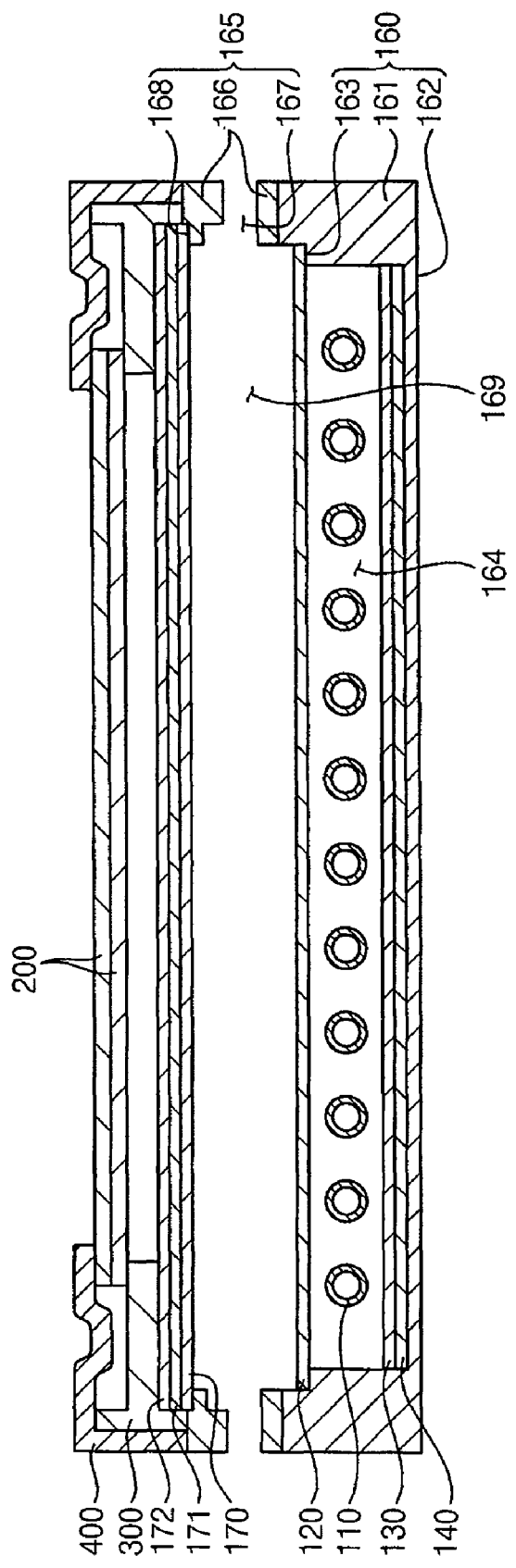
FIG. 5 is a cross-sectional view taken along a line II-II' in FIG. 4.

FIG. 4 is an exploded perspective view illustrating an exemplary embodiment of a backlight-display panel assembly. FIG. 5 is a cross-sectional view taken along a line II-II' in FIG. 4.

Referring to FIGS. 4 and 5, in an exemplary embodiment, the backlight-display panel assembly 501 may include a backlight assembly 101, a display panel 200, a lower mold frame 300 and an upper mold frame 400. The backlight assembly 101 may include a light source unit 110, a heat-blocking plate 120, a first receiving container 160 and a second receiving container 165. The backlight assembly 101 may further include a reflective plate 130, a heat-dissipation plate 140, a diffusion plate 170 and optical sheets 171 and 172.

In an exemplary embodiment, the backlight-display panel assembly 501 may be substantially the same as the backlight-display panel assembly 500 in the previous example embodiment of FIGS. 1 and 2, except for the first and second receiving containers 161 and 165. Thus, the same reference numerals will be used to refer to the same or like parts as those described in the previous example embodiment and any further repetitive explanation concerning the above elements will be omitted.

The first receiving container 160 may include a bottom plate 161 and a plurality of first sidewalls 162. In addition, a first stepped portion 163 may be formed at the first sidewalls 162 and may protrude inside of the first sidewalls 162 of the first receiving container 160. The bottom plate 161 may have a substantially rectangular shape. Each of the first sidewalls 162 is respectively extended from each of four sides of the bottom plate 161, and is substantially perpendicular to the bottom plate 161. The bottom plate 161 and the sidewalls 162 may be integrally formed, and alternatively, the bottom plate 161 and the sidewalls 162 may be combined with each other. A first receiving container 164 is formed by the bottom plate 161 and the first sidewalls 162, and the heat-blocking plate 120 covers over the first receiving space 164.

In an example embodiment, the heat-dissipation plate 140, the reflective plate 130 and the light source unit 110 are received in the first receiving space 164 formed by the bottom plate 161 and the first sidewalls 162, in sequence. The heat-blocking plate 120 is supported by the first stepped portion 163 formed on the upper portion of the first sidewalls 162. Thus, the first receiving space 164 is sealed by the first receiving container 160 and the heat-blocking plate 120.

The second receiving container 165 may include second sidewalls 166, and upper and lower surfaces of the second receiving container 165 may be opened. The second sidewalls 166 may be respectively combined with an upper portion of the first sidewalls 161 of the first receiving container 160. The second sidewalls 166 and the first sidewalls 161 may be combined with each other, for example, via a boss-groove combination or other arrangement as appropriate or desired. Thus, the receiving container of the backlight assembly 101 may have a height substantially the same as the receiving container 150 of the backlight assembly 100 in the previous example embodiment of FIGS. 1 and 2.

In an exemplary embodiment, a second stepped portion 168 may formed at the second sidewalls 166 and may protrude inside of the second sidewalls 166 of the second receiving container 160. The diffusion plate 170 may be mounted on the second stepped portion 168, and may be fixed and supported by the second stepped portion 168. In addition, the optical sheets 171 and 172 may be disposed over the diffusion plate 170.

Thus, a second receiving space 169 is formed inside of the second receiving container 16 by the second sidewalls 166 of the second receiving container 165, the heat-blocking plate 120 and the diffusion plate 170.

Openings 167 may be formed through the second sidewalls 166 of the second receiving container 165. As illustrated in FIG. 4, the openings 167 may be formed through all of the second sidewalls 166. Alternatively, the openings 167 may be formed through at least one of the second sidewalls 166. In addition, as mentioned above, the number and the shape of the openings 167 are not limited thereto. The net, the filter or other element or device may be formed around the openings 167 to minimize the influx of foreign matter. In addition, the fan may be attached around the opening 167 to circulate the air inside the second receiving container 169 and to mix it with the air from the outside of the second receiving container 169.

For example, the openings 167 may be formed through the second sidewalls 166 to face each other, to enhance the heat dissipation. Thus, the air inside of the second receiving container 169 may be easily circulated with the air from the outside of the second receiving container 169.

Accordingly, the openings 167 may be formed through the second sidewalls 166, so that the second receiving container 169 is opened along a direction of the second sidewall. Thus, the air having a high temperature inside of the second receiving container 169 may flow outside, decreasing the temperature inside of the second receiving container 169. In an exemplary embodiment, as mentioned above, the first receiving container 164 is maintained to be closed, so that variation of the temperature inside of the first receiving container 164 may be decreased.

The first and second receiving containers 160 and 165 may include a metal having better heat conductivity to easily dissipate the heat generated from the light source unit 110. For example, the first and second receiving containers 160 and 165 may include an aluminum material.

Although not shown in the figure, a covering part and a cooling part may be attached to the outside of the backlight-display panel assembly 501. The covering part and the cooling part according to the present example embodiment may be substantially the same as the covering part 510 and the cooling part 520 in the previous example embodiment of FIGS. 1 and 2, and thus the same reference numerals will be used to refer to the same or like parts as those described in the previous example embodiment and any further repetitive explanation concerning the above elements will be omitted.

Figure 6:
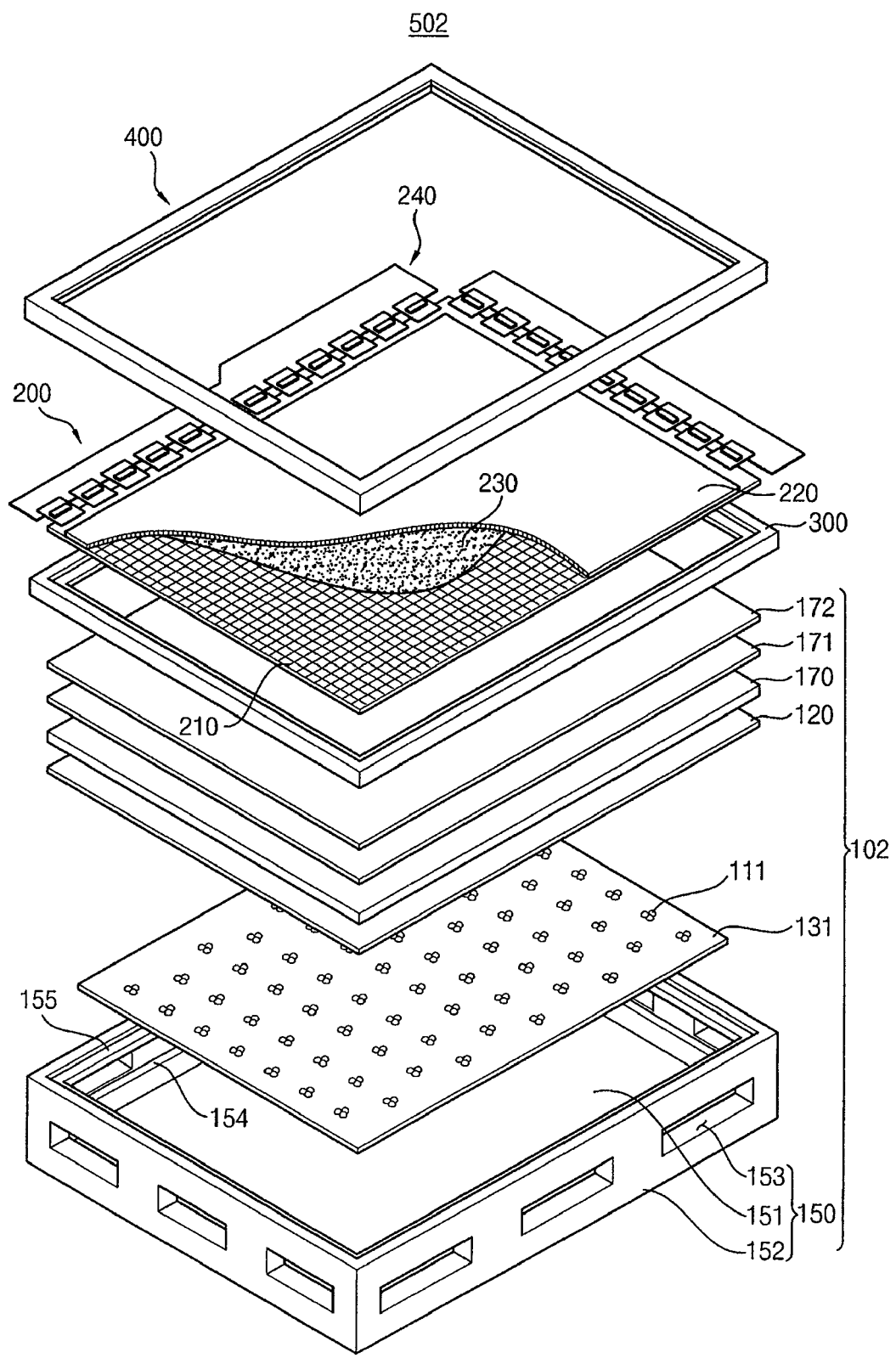
FIG. 6 is an exploded perspective view illustrating an example embodiment of a backlight-display panel assembly.

FIG. 6 is an exploded perspective view illustrating an exemplary embodiment of a backlight-display panel assembly.

Referring to FIG. 6, in an example embodiment, the backlight-display panel 502 may include a backlight assembly 102, a display panel 200, a lower mold frame 300 and an upper mold frame 400. The backlight assembly 102 may include a light source unit 111, a heat-blocking plate 120, a base substrate 131 and a receiving container 150, and may further include a reflective plate 130, a heat-dissipation plate 140, a diffusion plate 170 and optical sheets 171 and 172. The backlight-display panel assembly 502 may be substantially the same as the backlight-display panel assembly 500 in the previous example embodiment of FIG. 1 except for the light source unit 111 and the base substrate 131. Thus, the same reference numerals will be used to refer to the same or like parts as those described in the previous example embodiment and any further repetitive explanation concerning the above elements will be omitted.

In an exemplary embodiment, the light source unit 111 emits the light to provide the light to the display panel 200. As illustrated in FIG. 6, the light source unit 111 may include a plurality of point light sources. For example, the point light sources are mounted on the base substrate 131, and the base substrate 131 may include a printed circuit board (PCB). Although not shown in the figure, a control circuit which controls the point light sources may be printed on the base substrate 131. In addition, as illustrated in FIG. 6, the point light sources may be arranged in a matrix shape. Alternatively, the point light sources may be randomly arranged on an entire surface of the base substrate 131. The number and the arrangement of the point light sources may be determined considering a size and usage of the base substrate 131 and brightness required of the display panel 200.

The point light sources may include a light-emitting diode (LED) emitting white light. For example, each of the point light sources may include a red light source emitting red light having a red wavelength, a green light source emitting green light having a green wavelength and a blue light source emitting blue light having a blue wavelength. The red, green and blue LEDs may be combined to be a single chip. In this case, the red, green and blue light may be mixed to produce white light.

In an exemplary embodiment, the backlight-display panel assembly 502 may be substantially the same as the backlight-display panel assembly 500 in the previous example embodiment of FIG. 1 except for the light source unit 111 and the base substrate 131. Alternatively, although not shown in the figure, the backlight-display panel assembly 502 according to the present example embodiment may be substantially the same as the backlight-display panel assembly 501 in the previous example embodiment of FIG. 4 except for the light source unit 111 and the base substrate 131. In this case, the light source unit 110 of the backlight-display panel assembly 501 may be substituted for the light source unit 111 of the backlight-display panel assembly 502 in the example embodiment of FIG. 6.

In an exemplary embodiment, the heat-blocking plate may be disposed over the light source unit in the receiving space, so that the heat generated from the light source unit is prevented from being transmitted to the display panel. Thus, the display panel may be prevented from being deformed by the heat.

In addition, the openings may be formed through the sidewalls of the receiving container and the openings may be disposed over the heat-blocking plate, so that the heat generated from the light source unit may be dissipated outside before the heat is transmitted to the display panel. Thus, the temperature inside of the backlight assembly may be decreased, and the display panel may be prevented from being deformed by the heat.

In addition, the backlight-display panel assembly may be covered by the covering part, so that foreign matter is prevented from flowing inside of the display panel. Thus, the display quality may be maintained.

In addition, the display apparatus may include the cooling part, so that the air inside of the backlight-display panel assembly is circulated to pass through the openings. Thus, the temperature of the backlight assembly may be decreased, to prevent the display panel from being deformed by the heat.

Having described the example embodiments of the present invention and its advantage, it is noted that various changes, substitutions and alterations can be made herein without departing from the spirit and scope of the invention as defined by appended claims.

What is claimed is:

1. A backlight assembly comprising:
   a light source unit emitting light;
   a heat-blocking plate disposed over the light source unit, to prevent heat generated from the light source unit from being upwardly transmitted; and
   a receiving container sequentially receiving the light source unit and the heat-blocking plate, and including a bottom plate and a plurality of sidewalls substantially perpendicular to the bottom plate, each of the sidewalls extending from each side of the bottom plate and having openings formed through each of the sidewalls, the openings being formed above the heat-blocking plate.

2. The backlight assembly of claim 1, wherein the openings are formed through the sidewalls to face each other.

3. The backlight assembly of claim 1, further comprising a diffusion plate disposed over the sidewalls, to diffuse the light incident from the light source unit.

4. The backlight assembly of claim 3, further comprising optical sheets disposed over the diffusion plate, to enhance the efficiency of the light incident from the light diffusion plate.

5. The backlight assembly of claim 4, further comprising a reflective plate disposed under the light source unit and received by the receiving container, to reflect the light from the light source unit to the diffusion plate.

6. The backlight assembly of claim 5, further comprising a heat-dissipation plate disposed under the reflective plate and received by the receiving container, to diffuse the heat generated from the light source unit to the bottom plate of the receiving container.

7. The backlight assembly of claim 1, wherein the heat-blocking plate includes a transparent plastic material.

8. The backlight assembly of claim 7, wherein the transparent plastic material includes an acrylic resin.

9. The backlight assembly of claim 7, wherein the receiving container includes a metal.

10. A backlight assembly comprising:
    a light source unit emitting light;
    a heat-blocking plate disposed over the light source unit, to prevent heat generated from the light source unit from being upwardly transmitted;
    a first receiving container including a bottom plate and a plurality of first sidewalls extending from sides of the bottom plate to form a receiving space, in order to sequentially receive the light source unit and the heat-blocking plate; and
    a second receiving container disposed over the heat-blocking plate, combined with the first sidewalls of the first receiving container, and including a plurality of second sidewalls having openings formed through the second sidewalls.

11. The backlight assembly of claim 10, further comprising a diffusion plate disposed over the second sidewalls of the second receiving container, to diffuse the light incident from the light source unit.

12. The backlight assembly of claim 10, wherein the openings are formed through the second sidewalls to face each other.

13. A display apparatus comprising:
    a backlight assembly including:
    a light source unit emitting light;
    a heat-blocking plate disposed over the light source unit, to prevent heat generated from the light source unit from being upwardly transmitted;
    a receiving container sequentially receiving the light source unit and the heat-blocking plate, and including a bottom plate and a plurality of sidewalls substantially perpendicular to the bottom plate, each of the sidewalls extending from one side of the bottom plate and having openings formed through each of the sidewalls, the openings being formed over the heat-blocking plate; and a diffusion plate disposed over the sidewalls of the receiving container, to diffuse the light incident from the light source unit;

a display panel disposed over the backlight assembly to display an image; and upper and lower mold frames fixing the display panel.

14. The display apparatus of claim 13, further comprising a covering part covering the outside of the backlight assembly, a display panel and the upper and lower mold frames, to prevent foreign matter from flowing into the backlight assembly, a display panel and the upper and lower mold frames.

15. The display apparatus of claim 14, wherein the covering part is spaced apart from the backlight assembly, a display panel and the upper and lower mold frames, to form a space in which air inside of the covering part circulates.

16. The display apparatus of claim 14, further comprising a cooling part disposed around the covering part, to circulate air inside of the covering part.

17. A display apparatus comprising:
a backlight assembly including:
a light source unit emitting light;
a first receiving container including a bottom plate and a plurality of first sidewalls extending from sides of the bottom plate to form a receiving space, in order to sequentially receive the light source unit;
a second receiving container disposed over the first receiving container, combined with the first sidewalls of the first receiving container, and including a plurality of second sidewalls having openings formed through the second sidewalls; and
a diffusion plate disposed over the second sidewalls of the second receiving container, to diffuse the light incident from the light source unit;

a display panel disposed over the backlight assembly to display an image; and upper and lower mold frames fixing the display panel.

18. The display apparatus of claim 17, further comprising a covering part covering the outside of the backlight assembly, a display panel and the upper and lower mold frames, to prevent foreign matter from flowing into the backlight assembly, a display panel and the upper and lower mold frames.

19. The display apparatus of claim 18, wherein the covering part is spaced apart from the backlight assembly, a display panel and the upper and lower mold frames, to form a space in which air inside of the covering part circulates.

20. The display apparatus of claim 19, wherein the backlight assembly further comprises a heat-blocking plate disposed over the light source unit, to prevent heat generated from the light source unit from being upwardly transmitted.

21. The display apparatus of claim 18, further comprising a cooling part disposed around the covering part, to circulate air inside of the covering part.

22. A method for assembling a backlight assembly, the method comprising:
disposing a heat-blocking plate over a light source unit; and
sequentially receiving the light source unit and the heat-blocking plate under openings of sidewalls in a receiving space, the receiving space being formed by a receiving container including a bottom plate and a plurality of sidewalls substantially perpendicular to the bottom plate extending from sides of the bottom plate respectively, the sidewalls including the openings formed through the sidewalls.

23. The method of claim 22, further comprising disposing a diffusion plate over the sidewalls of the receiving container.

* * * * *